United States Patent
Liu et al.

(10) Patent No.: US 8,544,360 B2
(45) Date of Patent: Oct. 1, 2013

(54) FIXING SEAT AND INDUSTRIAL ROBOT USING THE SAME

(75) Inventors: Jun Liu, Shenzhen (CN); Jun-Hai Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 474 days.

(21) Appl. No.: 12/890,860

(22) Filed: Sep. 27, 2010

(65) Prior Publication Data

US 2011/0154933 A1 Jun. 30, 2011

(30) Foreign Application Priority Data

Dec. 30, 2009 (CN) .......................... 2009 1 0312566

(51) Int. Cl.
*B25J 17/00* (2006.01)
*B25J 17/02* (2006.01)
*B25J 18/00* (2006.01)

(52) U.S. Cl.
USPC ...................... 74/490.02; 74/490.05; 901/27

(58) Field of Classification Search
USPC ............... 74/490.01, 490.02, 490.03, 490.05, 74/490.06; 901/27, 28
See application file for complete search history.

(56) References Cited

U.S. PATENT DOCUMENTS

| | | | | |
|---|---|---|---|---|
| 4,864,888 A | * | 9/1989 | Iwata | 74/640 |
| 5,816,107 A | * | 10/1998 | Takahashi et al. | 74/490.02 |
| 2002/0066331 A1 | * | 6/2002 | Okada et al. | 74/490.03 |
| 2009/0114052 A1 | * | 5/2009 | Haniya et al. | 74/490.03 |
| 2010/0175495 A1 | * | 7/2010 | Pan et al. | 74/490.02 |
| 2012/0103125 A1 | * | 5/2012 | Liu | 74/490.02 |

FOREIGN PATENT DOCUMENTS

EP    0502832 A1    9/1992

* cited by examiner

*Primary Examiner* — Justin Krause
(74) *Attorney, Agent, or Firm* — Altis & Wispro Law Group, Inc.

(57) ABSTRACT

An industrial robot includes a first rotation assembly, a second rotation assembly, and a cable assembly. The first rotation assembly includes a holding seat, a first rotation shaft rotatably positioned in the holding seat, and a first driver driving the first rotation shaft to rotate. The second rotation assembly includes a fixing seat. The cable assembly is received in the first rotation assembly and the second rotation assembly. The fixing seat includes a main body and a retaining portion extending from one end of the main body, and the main body of the fixing seat is positioned on the holding seat and fixed with the first rotation shaft of the first rotation assembly. The main body of the fixing seat defines a passing slot to receive the cable assembly and a passing hole communicating with the passing slot through which the cable assembly passes.

20 Claims, 4 Drawing Sheets

FIXING SEAT AND INDUSTRIAL ROBOT USING THE SAME

BACKGROUND

1. Technical Field

The present disclosure generally relates to a fixing seat and an industrial robot using the same.

2. Description of Related Art

As developments in manufacturing technology grows, industrial robots are increasingly applied to perform functions in environments considered hazardous or difficult for operators. Fixing seats are indispensable elements of the industrial robot.

Cables are provided to transmit electric signals or control signals for the specific elements of the industrial robot, and in order to maintain an orderly appearance, the cables are housed inside the industrial robot and passed through a plurality of arms of the industrial robot in order. When running from one arm to another, the cables pass through the holes in the arms. However, the rotation of the arms may abrade or even break off part of the cables adjacent to the holes through which the cables are passed, as a consequence, the stability of the industrial robot is reduced.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
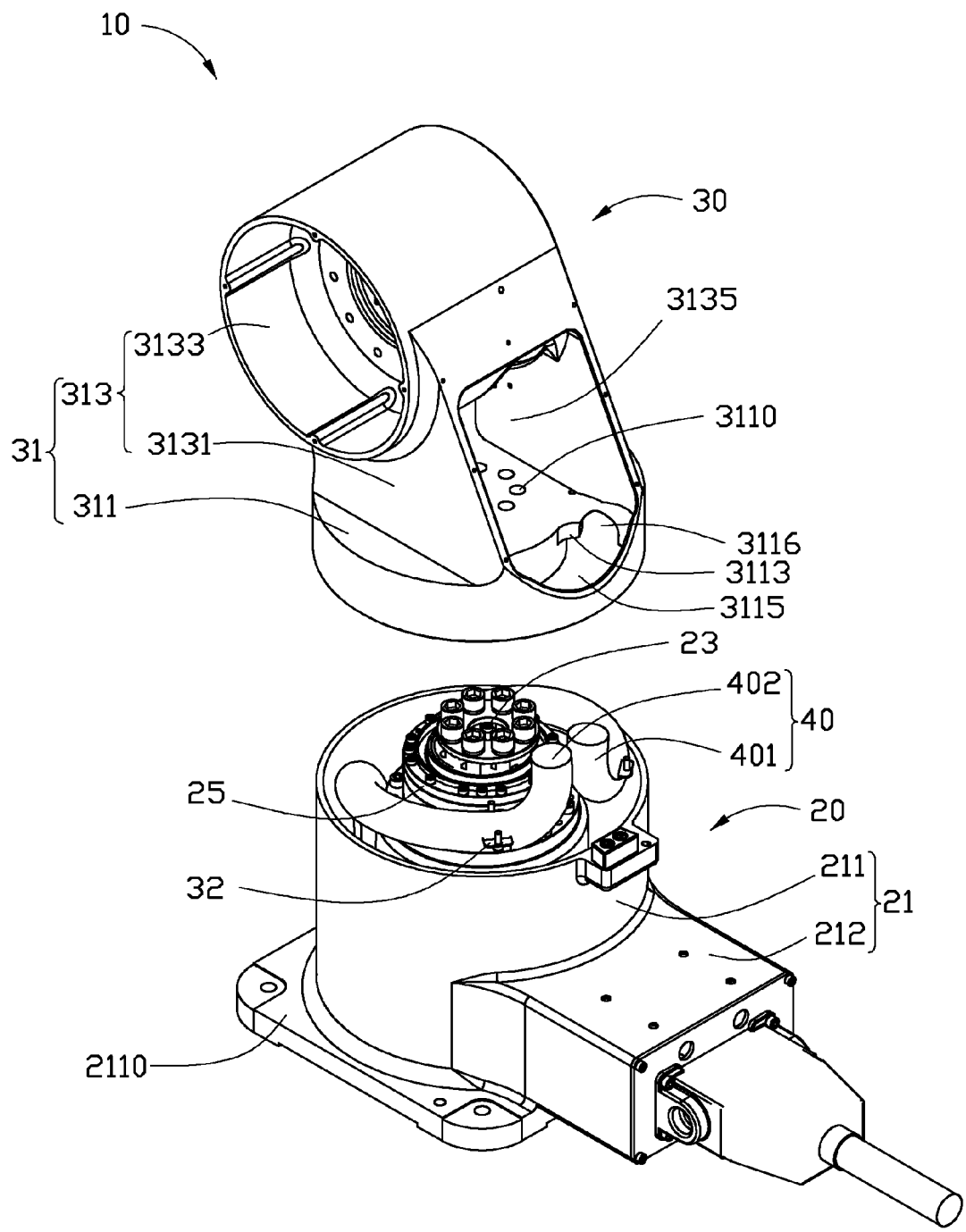
FIG. 1 is a partially exploded, isometric view of an industrial robot, in which the industrial robot includes a fixing seat.

Referring to FIG. 1, while an industrial robot 10 as shown is a six-axis industrial robot, only a first rotation assembly 20, a second rotation assembly 30, and a cable assembly 40 are shown, for brevity.

Figure 2:
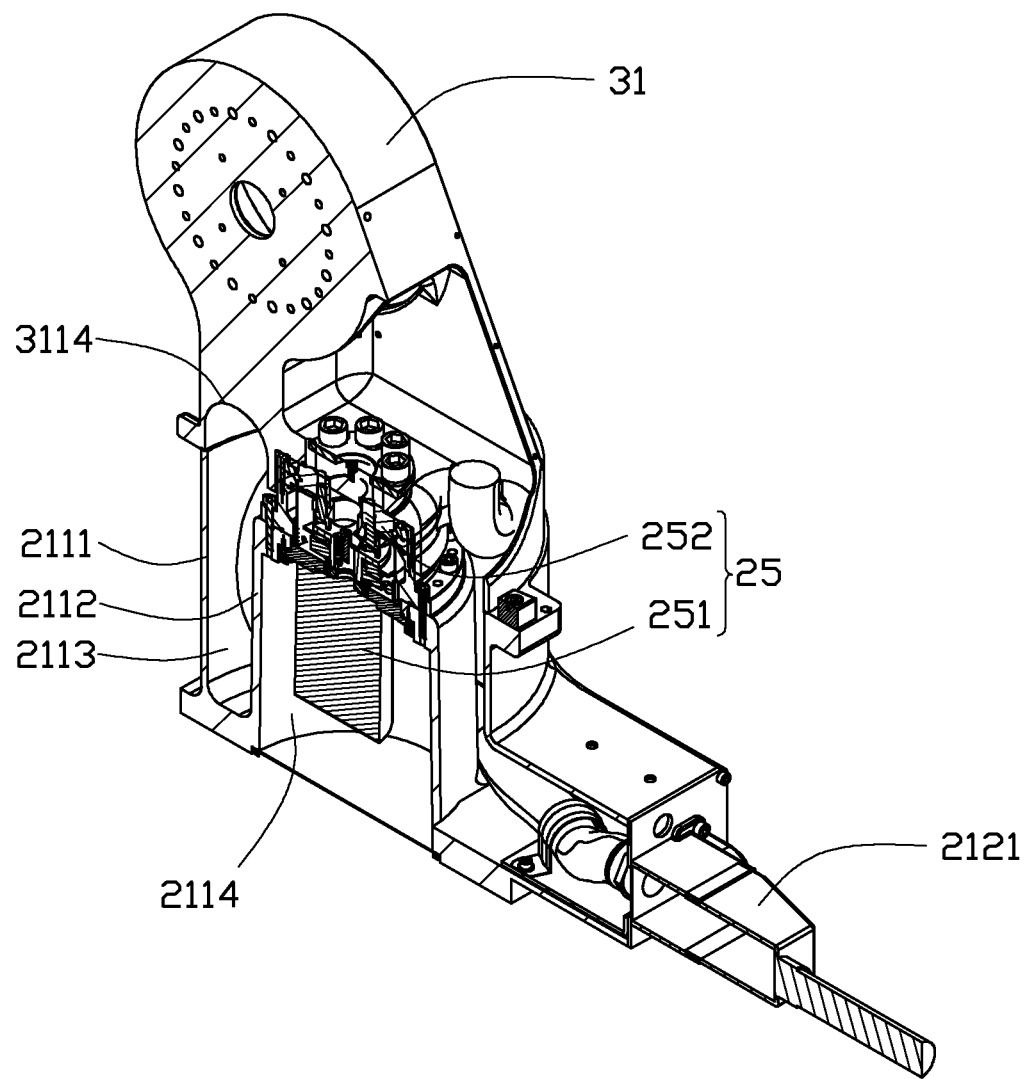
FIG. 2 is a cross-section of the industrial robot of FIG. 1.

Also referring to FIG. 2, the first rotation assembly 20 includes a holding seat 21, a first rotation shaft 23 rotatably positioned in the holding seat 21, and a first driver 25 rotating the first rotation shaft 23.

The holding seat 21 may be molded, and includes a main body 211 and an entrance portion 212 on one side of the main body 211, and is substantially perpendicular to the main body 211. The main body 211 is substantially columnar, and includes a base 2110, an outer support portion 2111, and an inner support portion 2112. The outer support portion 2111 and the inner support portion 2112 are formed on the base 2110 and substantially perpendicular to the base 2110. A channel 2113, for receiving the cable assembly 40, is formed between the outer support portion 2111 and the inner support portion 2112. The inner support portion 2112 defines a receiving space 2114 to receive part of the first rotating shaft 23 and the first driver 25 therein. The entrance portion 212 is substantially rectangular, and includes a plug 2121 away from the holding seat 211. The cable assembly 40 is received in the channel 2113 of the holding seat 211 through the plug 2121.

In the illustrated embodiment, the outer support portion 2111 and the inner support portion 2112 are substantially cylindrical having different diameters. Alternatively, the outer support portion 2111 and the inner support portion 2112 may be a plurality of hollow prisms or other structures.

The first driver 25 includes a drive member 251 and a deceleration member 252, and the deceleration member 252 connects the first rotation shaft 23 and the drive member 251. The drive member 251 may be a motor or an element driven by external power supply or controller. The deceleration member 252 may be a rotational vector (RV) retarder or harmonic drive (HD) retarder. The deceleration member 252 may be omitted when the rotation speed of the drive member 251 is sufficiently low.

The second rotation assembly 30 includes a fixing seat 31, a second rotation shaft (not shown) in the fixing seat 31, a second driver (not shown) driving the second rotation shaft, and two holding members 32. In the illustrated embodiment, an axis of the second rotation shaft is substantially perpendicular to that of the first rotation shaft 23.

Figure 3:
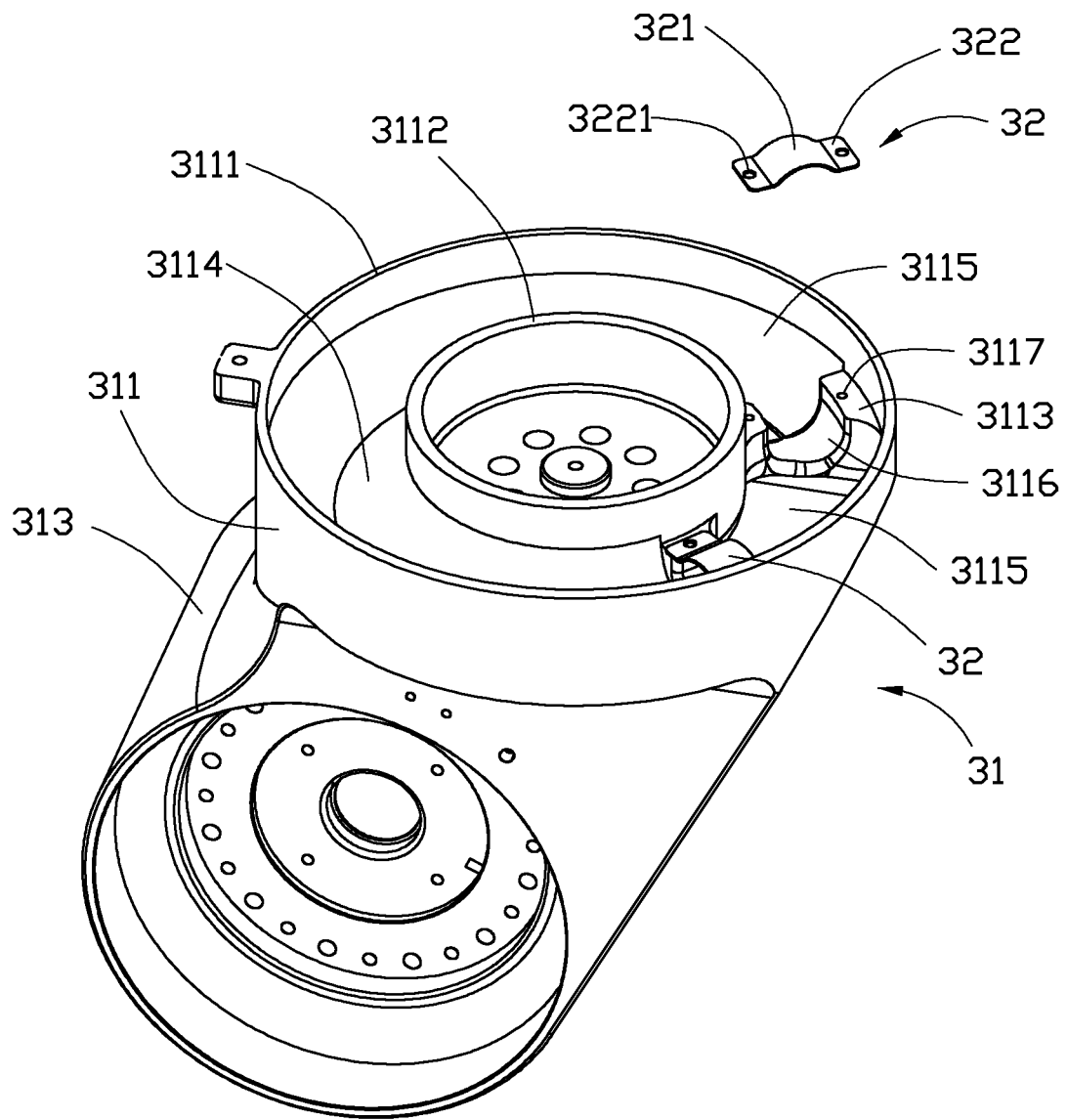
FIG. 3 is an isometric view of the fixing seat of the industrial robot of FIG. 1.

Also referring to FIG. 3, the fixing seat 31 is molded and includes a main body 311 and a retaining portion 313 extending from one end of the main body 311. The main body 311 defines a plurality of fixing holes 3110 in a central portion thereof, and the main body 311 and the first rotation shaft 23 are fixed by a plurality of fasteners (not labeled) passing through the fixing holes 3110. The main body 311 includes an exterior sidewall 3111, an inner sidewall 3112, and two connection portions 3113 between the exterior sidewall 3111 and the inner sidewall 3112. The main body 311 defines a passing slot 3114 and a passing hole 3115 communicating with each other, and between the exterior sidewall 3111 and the inner sidewall 3112.

The exterior sidewall 3111 and the inner sidewall 3112 are formed on one side of the main body 311 extending away from the retaining portion 313. In the illustrated embodiment, the exterior sidewall 3111 and the inner sidewall 3112 are a plurality of cylinders having different diameters. Alternatively, the exterior sidewall 3111 and the inner sidewall 3112 may be a plurality of hollow rhombic posts or other structures.

The connection portions 3113 are formed adjacent to different sides of the passing hole 3115. The connection portions 3113 can be molded together with the exterior sidewall 3111 and the inner sidewall 3112, or can be molded separately and then joined together to the exterior sidewall 3111 and the inner sidewall 3112. Each connection portion 3113 defines a curved recess 3116 having a width less than that of the passing slot 3114. Each connection portion 3113 defines two fastener holes 3117 adjacent to the recess 3116. Alternatively, more than two fastener holes 3117 can be defined in each connection portion 3113, and at least one or more than two connection portions 3113 may employed.

The substantially circular passing slot 3114 is formed during the process of molding the fixing seat 31. The passing hole 3115 is substantially arched.

The retaining portion 313 includes a support 3131 connecting with the main body 311 and an assembly part 3133 substantially perpendicular to the main body 311. The support 3131 defines a hollow space 3135 communicating with the passing hole 3115. The assembly part 3133 is a cylinder capable of receiving the second rotation shaft and the second driver. The second driver is similar to the first driver 25 and also includes a drive member and a deceleration member.

The holding members 32 include a curved portion 321 and two locking portions 322 connected with the curved portion 321. The curved portion 321 of each holding member 32 and the recess 3116 of each connection portion 3113 cooperatively form a substantially circular space to receive the cable assembly 40. Each locking portion 322 defines two through holes 3221 corresponding to the fastener holes 3117 in each connection portion 3113. Alternatively, each locking portion 322 may define more than two through holes 3221. The number of holding members 32 can change according to the number of the connection portions 3113. The fastener holes 3117 in the connection portion 3113 and the through holes 3221 may be omitted, and the holding members 32 fixed or adhered to the connection portions 3113 directly.

The cable assembly 40, passing through the rotation assemblies of the industrial robot 10, includes a first cable 401 and a second cable 402. In the illustrated embodiment, the cable assembly 40 is connected with a motor (not shown), and the first cable 401 transmits the control signal, and the second cable 402 transmits the electric power. Alternatively, the first cable 401 and the second cable 402 may be other cables, such as fiber cables.

Figure 4:
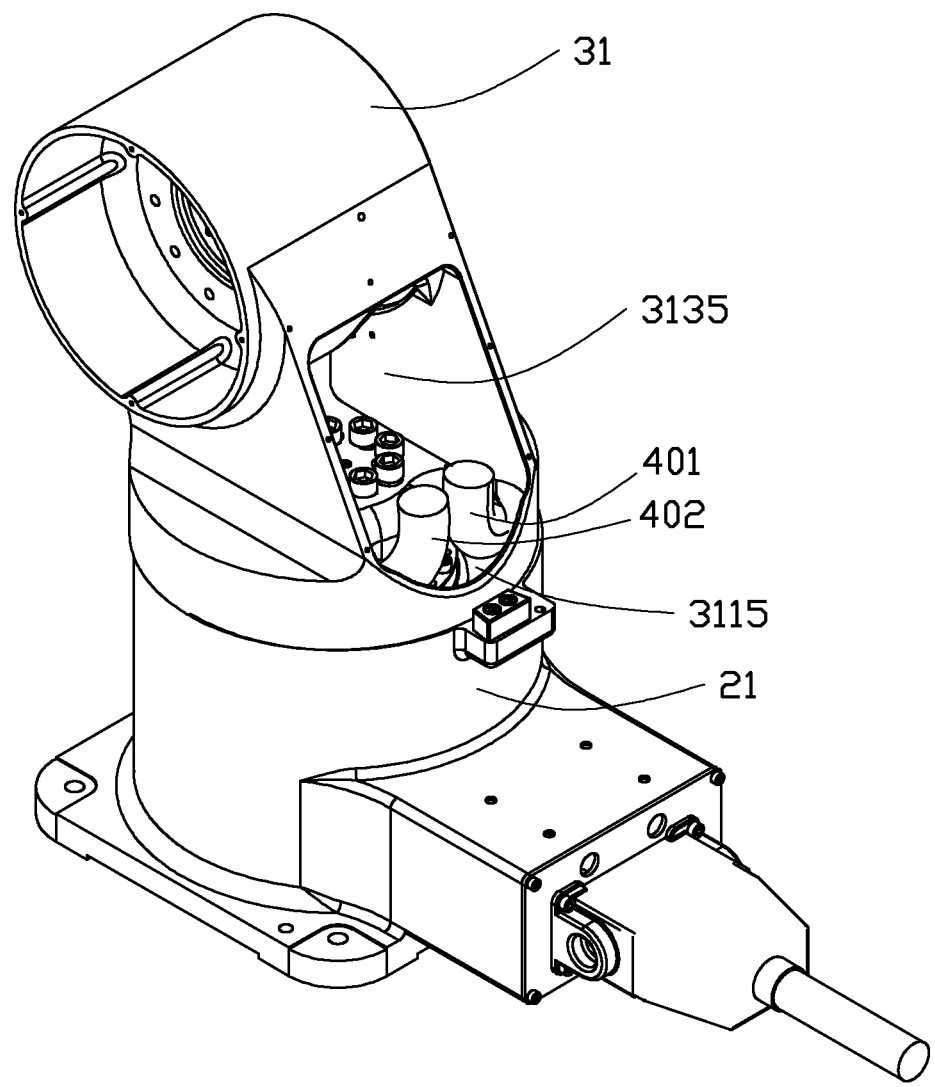
FIG. 4 is an assembled, isometric view of the industrial robot of FIG. 1.

Also referring to FIG. 4, during assembly of the industrial robot 10, the cable assembly 40 is received in the channel 2113 in the main body 211 of the holding seat 21 through the plug 2121 of the entrance portion 212. The cable assembly 40 is separated to form the first cable 401 and the second cable 402 in the channel 2113. The first cable 401 and the second cable 402 run through the passing slot 3114 in different directions. One of the first cable 401 and the second cable 402 passes through the passing hole 3115, and is fixed by one connection portion 3113 and one holding member 32 cooperatively. The other one of the first cable 401 and the second cable 402 passes through the passing hole 3115, and is fixed by the other connection portion 3113 and the other holding member 32 cooperatively. The fasteners (not shown) lock the locking portions 322 of the holding members 32 to the corresponding connection portions 3113. The fixing seat 31 is fixed to the first rotation shaft 23 by a plurality of fasteners (not labeled).

Since the fixing seat 31 of the second rotation assembly 30 defines a passing slot 3114 for receiving the cable assembly 40 before the passage of the cable assembly 40 through the passing hole 3115, when the second rotation assembly 30 rotates relative to the first rotation assembly 20, the cable assembly 40 is afforded sufficient latitude to rotate therewith, such that damage thereto is thereby avoided, lifespan of the cable assembly 40 is extended, and the stability of the industrial robot 10 using the fixing seat 31 is enhanced.

The recess 3116 of each connection portion 3113 has a width less than that of the passing hole 3115, and therefore, the cable assembly 40 is retained in the recess 3116.

Alternatively, the industrial robot 10 may includes two-axis, three-axis, or more. The connection portions 3113 and the holding members 32 may be omitted when the fixing seat 31 rotates in a limited range.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An industrial robot, comprising:
   a first rotation assembly comprising a holding seat, a first rotation shaft rotatably positioned in the holding seat, and a first driver for driving the first rotation shaft to rotate;
   a second rotation assembly comprising a fixing seat; and
   a cable assembly positioned in the first rotation assembly and the second rotation assembly;
   wherein the fixing seat comprises a main body and a retaining portion extending from one end of the main body, and the main body of the fixing seat is positioned on the holding seat, and is fixed with the first rotation shaft of the first rotation assembly; the main body of the fixing seat defines a passing slot to receive the cable assembly and a passing hole communicating with the passing slot through which the cable assembly passes, the main body of the fixing seat comprises an exterior sidewall and an inner sidewall extending away from the retaining portion, and at least one connection portion between the exterior sidewall and the inner sidewall; the second rotation assembly further comprises at least one holding member corresponding to the at least one connection portion, and the cable assembly is fixed by the at least one holding member and the at least one connection portion, which defines a recess, cooperatively.

2. The industrial robot of claim 1, wherein the passing slot is between the exterior sidewall and the inner sidewall.

3. The industrial robot of claim 1, wherein the at least one connection portion is formed adjacent to the passing hole.

4. The industrial robot of claim 3, wherein two connection portions and two holding members are employed, the two connection portions formed adjacent to two sides of the passing hole; and the cable assembly comprises a first cable and a second cable, and one of the first cable and the second cable is received in part of the passing slot and the recess of one connection portion, and the other one of the first cable and the second cable is received in the remaining part of the passing slot and the recess of the other connection portion.

5. The industrial robot of claim 4, wherein the exterior sidewall and the inner sidewall are a plurality of substantially cylinders; the passing hole is substantially annular and in line with the recess of each connection portion, and the passing hole has a width greater than that of the recess.

6. The industrial robot of claim 4, wherein each holding member comprises a curved portion and two locking portions extending from opposite ends of the curved portion, and the curved portion of each holding member and the recess of each connection portion cooperatively define a substantially circular space to receive the cable assembly.

7. The industrial robot of claim 6, wherein each connection portion further defines a plurality of fastener holes adjacent to different sides of the recess, and the locking portions define a plurality of through holes corresponding to the fastener holes in the connection portions, and the cable assembly is held between the connection portions and the holding members.

8. The industrial robot of claim 1, wherein the holding seat of the first rotation assembly comprises a main body and an entrance portion through which the cable assembly is received in the main body.

9. The industrial robot of claim 8, wherein the main body comprises a base and an outer support portion and an inner support portion, both the outer support portion and the inner support portion are substantially perpendicular to the base, and cooperatively define a channel to receive the cable assembly.

10. The industrial robot of claim 9, wherein the inner support portion defines a receiving space in which part of the first rotation shaft and the first driver are received.

11. The industrial robot of claim 1, wherein the first driver comprises a drive member and a deceleration member connected with the drive member.

12. The industrial robot of claim 11, wherein the drive member is a motor, and the cable assembly is a motor cable.

13. An industrial robot, comprising:
a first rotation assembly comprising a holding seat, a first rotation shaft rotatably positioned in the holding seat, and a first driver for driving the first rotation shaft to rotate;
a second rotation assembly comprising a fixing seat; and
a cable assembly positioned in the first rotation assembly and the second rotation assembly;
wherein the fixing seat comprises a main body and a retaining portion extending from one end of the main body, and the main body of the fixing seat is positioned on the holding seat, and is fixed with the first rotation shaft of the first rotation assembly; the main body of the fixing seat defines a passing slot to receive the cable assembly and a passing hole communicating with the passing slot through which the cable assembly passes, the passing slot is substantially annular, and the cable assembly is separated to form a first cable and a second cable running through the passing slot in different directions, and passing the passing hole from opposite sides of the passing hole, thereby connecting with the second rotation assembly.

14. The industrial robot of claim 13, wherein the main body of the fixing seat comprises an exterior sidewall and an inner sidewall extending away from the retaining portion, and at least one connection portion between the exterior sidewall and the inner sidewall; the second rotation assembly further comprises at least one holding member corresponding to the at least one connection portion, and the cable assembly is fixed by the at least one holding member and the at least one connection portion, which defines a recess, cooperatively.

15. The industrial robot of claim 14, wherein the passing slot is between the exterior sidewall and the inner sidewall.

16. The industrial robot of claim 14, wherein the at least one connection portion is formed adjacent to the passing hole.

17. The industrial robot of claim 16, wherein two connection portions and two holding members are employed, the two connection portions formed adjacent to two sides of the passing hole; one of the first cable and the second cable is received in part of the passing slot and the recess of one connection portion, and the other one of the first cable and the second cable is received in the remaining part of the passing slot and the recess of the other connection portion.

18. The industrial robot of claim 17, wherein each holding member comprises a curved portion and two locking portions extending from opposite ends of the curved portion, and the curved portion of each holding member and the recess of each connection portion cooperatively define a substantially circular space to receive the cable assembly.

19. The industrial robot of claim 17, wherein the exterior sidewall and the inner sidewall are a plurality of substantially cylinders; the passing hole is substantially annular and in line with the recess of each connection portion, and the passing hole has a width greater than that of the recess.

20. The industrial robot of claim 18, wherein each connection portion further defines a plurality of fastener holes adjacent to different sides of the recess, and the locking portions define a plurality of through holes corresponding to the fastener holes in the connection portions, and the cable assembly is held between the connection portions and the holding members.

* * * * *